(12) United States Patent
Payne et al.

(10) Patent No.: US 9,702,718 B2
(45) Date of Patent: Jul. 11, 2017

(54) SYSTEMS AND METHODS FOR IMPROVING ENERGY EFFICIENCY OF A VEHICLE BASED ON ROUTE PREDICTION

(71) Applicant: Toyota Motor Engineering & Manufacturing North America, Inc., Erlanger, KY (US)

(72) Inventors: Joshua D. Payne, Irvine, CA (US); Mohammad E. Dufford, Los Angeles, CA (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 14/708,051

(22) Filed: May 8, 2015

(65) Prior Publication Data
US 2016/0325637 A1 Nov. 10, 2016

(51) Int. Cl.
*B60L 11/18* (2006.01)
*B60L 7/10* (2006.01)
(Continued)

(52) U.S. Cl.
CPC ........ *G01C 21/3469* (2013.01); *B60L 3/0046* (2013.01); *B60L 3/04* (2013.01); *B60L 3/12* (2013.01); *B60L 7/14* (2013.01); *B60L 11/14* (2013.01); *B60L 11/1816* (2013.01); *B60L 11/1861* (2013.01); *B60L 15/2009* (2013.01); *B60L 15/2045* (2013.01); *B60L 2210/10* (2013.01); *B60L 2210/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/545* (2013.01); *B60L 2240/547* (2013.01);
(Continued)

(58) Field of Classification Search
CPC ..... B60L 11/1862; B60L 7/10; G01C 21/3469

USPC .......................................................... 701/22
See application file for complete search history.

(56) References Cited

U.S. PATENT DOCUMENTS

| | | | |
|---|---|---|---|
| 5,931,245 A | 8/1999 | Uetake et al. | |
| 6,230,496 B1 | 5/2001 | Hofmann et al. | |
| 6,314,347 B1* | 11/2001 | Kuroda | B60K 6/543 701/22 |
| 6,334,498 B1 | 1/2002 | Morisawa et al. | |
| 7,360,615 B2* | 4/2008 | Salman | B60K 6/52 180/65.265 |
| 7,702,432 B2 | 4/2010 | Bandai et al. | |
| 8,095,290 B2 | 1/2012 | Smyth et al. | |
| 8,370,012 B2* | 2/2013 | Yamada | B60K 6/46 180/65.21 |
| 8,374,740 B2 | 2/2013 | Druenert et al. | |
| 8,543,273 B2 | 9/2013 | Pfefferl | |
| 8,813,884 B2 | 8/2014 | Roos et al. | |
| 8,903,578 B2 | 12/2014 | Yamazaki et al. | |
| 9,008,858 B1 | 4/2015 | Payne et al. | |

(Continued)

FOREIGN PATENT DOCUMENTS

| | | |
|---|---|---|
| EP | 1256476 | 11/2002 |
| JP | 2009-090735 | 4/2009 |
| WO | WO 2014/099354 | 6/2014 |

*Primary Examiner* — Jelani Smith
*Assistant Examiner* — Majdi Alsomiri
(74) *Attorney, Agent, or Firm* — Snell & Wilmer LLP

(57) ABSTRACT

A hybrid vehicle includes one or more processors, a memory, an engine, a battery, and a motor. The motor is configured to utilize electrical energy stored in the battery for powering a movement of the wheels or an operation of the hybrid vehicle. A memory stores route data and corresponding vehicle operation data. The one or more processors predict, based on the route data, that the hybrid vehicle will travel on a second route after travelling on a first route. The one or more processors predict, based on the vehicle operation data, that the state of charge (SOC) of the battery will reach or exceed a threshold value during the second route. The one or more processors set a target SOC for the battery. The one or more processors discharge the electrical energy stored in the battery during the first route based on the target SOC value.

19 Claims, 8 Drawing Sheets

(51) Int. Cl.
  *G01C 21/34* (2006.01)
  *B60L 3/00* (2006.01)
  *B60L 3/04* (2006.01)
  *B60L 3/12* (2006.01)
  *B60L 7/14* (2006.01)
  *B60L 11/14* (2006.01)
  *B60L 15/20* (2006.01)

(52) U.S. Cl.
  CPC ... *B60L 2240/549* (2013.01); *B60L 2240/622* (2013.01); *B60L 2240/642* (2013.01); *B60L 2240/645* (2013.01); *B60L 2250/16* (2013.01); *B60L 2260/52* (2013.01); *B60L 2260/54* (2013.01); *Y02T 10/7005* (2013.01); *Y02T 90/127* (2013.01); *Y02T 90/14* (2013.01); *Y02T 90/16* (2013.01); *Y02T 90/162* (2013.01)

(56) References Cited

U.S. PATENT DOCUMENTS

| | | | |
|---|---|---|---|
| 2008/0021628 A1* | 1/2008 | Tryon | B60K 6/46 701/99 |
| 2008/0027639 A1* | 1/2008 | Tryon | B60K 6/46 701/533 |
| 2013/0024055 A1 | 1/2013 | Hysko, Jr. et al. | |
| 2014/0114514 A1 | 4/2014 | Crombez et al. | |
| 2015/0032317 A1 | 1/2015 | Kato | |
| 2015/0046000 A1 | 2/2015 | Zhao et al. | |

* cited by examiner

SYSTEMS AND METHODS FOR IMPROVING ENERGY EFFICIENCY OF A VEHICLE BASED ON ROUTE PREDICTION

BACKGROUND

Field

The present invention relates to systems and methods for improving energy efficiency of a hybrid vehicle and for route prediction.

Description of the Related Art

With global energy prices rapidly increasing, users of vehicles that utilize various forms of energy are increasingly interested in enhancing the overall energy efficiency of the vehicle. The overall energy efficiency accounts for consumption of various forms of energy including fuel energy and electrical energy.

It is desirable to enhance the ability of hybrid vehicles to regenerate energy for storage in a battery (when regeneration is available). For example, when a hybrid vehicle travels downhill for a relatively long distance, regenerative braking can contribute significantly to battery charging. However, if the battery is in a full state of charge and does not have the capacity to be charged, the opportunity to store regenerated energy is missed. Therefore, it is desirable to prevent or reduce the duration of a battery charging limitation event during which the battery cannot be charged using regenerated energy.

There is a need in the art for a method and a system that can effectively analyze collected data regarding previously driven routes and corresponding vehicle operation data. Furthermore, there is a need in the art for a method and a system for modifying vehicle operations based on the collected data in order to enhance overall energy efficiency.

SUMMARY

The present invention relates to improving energy efficiency of a hybrid vehicle. It is desirable to increase the amount of energy that can be recaptured using an energy generation unit. An important source of regeneration of energy is regenerative braking which can generate a considerable amount of electrical energy for storage in a battery of the hybrid vehicle. If the battery has a full state of charge and without sufficient capacity to be charged, then the opportunity to store regenerated braking energy would be missed. The present invention is directed to advantageously learning vehicle operation data during previously driven routes, and utilizing the previously learned vehicle operation data for preventing or at least reducing duration of energy inefficient events.

According to an aspect of the present invention, a hybrid vehicle includes an engine for providing a first amount of power for at least one of a movement of wheels or an operation of the hybrid vehicle. A motor is configured to utilize electrical energy stored in a battery for providing a second amount of power for at least one of a movement of the wheels or an operation of the hybrid vehicle. A memory is provided for storing route data and corresponding vehicle operation data. One or more processors are coupled to at least the engine, the motor, and the memory. The one or more processors are configured to predict, based on the route data, that the hybrid vehicle will travel on a second route after travelling on a first route. The one or more processors further predict, based on the vehicle operation data, that the state of charge of the battery will reach or exceed a state of charge threshold value during the second route. The one or more processors set a target state of charge value for the battery that is less than the state of charge threshold value. The one or more processors discharge the electrical energy stored in the battery during at least a portion of the first route based on the target state of charge value, for powering a movement of the wheels.

According to another aspect of the present invention, a method of enhancing energy efficiency of a hybrid vehicle is provided. The hybrid vehicle has wheels, an engine, and a battery for storing electrical energy and having a state of charge. The hybrid vehicle further has a motor for utilizing electrical energy stored in the battery. The hybrid vehicle further has a memory communicatively coupled to one or more processors. First location data and first time data for a first route are stored in the memory. Second location data and second time data for a second route are stored in the memory. A link or relationship between the first route and the second route are stored in the memory. The one or more processors are configured to determine a battery charging limitation event on the second route. The battery charging limitation event indicates that the state of charge of the battery has reached or exceeded a state of charge threshold value. Vehicle operation data for the second route are stored in memory based on the battery charging limitation event. The one or more processors predict that the hybrid vehicle will travel on the second route after traveling on the first route, based on the link or relationship between the first route and the second route. The one or more processors further predict, based on the vehicle operation data, that the battery charging limitation event will occur during the second route. The one or more processors set a target state of charge value for the battery, which is less than the state of charge threshold value based on the battery charging limitation event. The one or more processors discharge the electrical energy stored in the battery during at least a portion of the first route based on the target state of charge value.

The system/method described above advantageously increases an amount of electrical energy consumption for powering a movement of the wheels when the system/method predicts that the vehicle will travel on the route associated with the charging limitation event. As a result, the vehicle will discharge electrical energy to leave an energy storage margin. An advantage of providing the energy storage margin is that the battery will have sufficient capacity to accept electrical energy generated using regenerative braking. The system/method advantageously allows regenerated energy (that would have otherwise been lost due to the charging limitation event) to be stored in the battery and used to power operations of the vehicle. Yet another advantage of the present invention is that fuel consumption is reduced because the energy that is regenerated and stored in the battery can be effectively used to power operations and/or movements of the vehicle.

Therefore, the system and method of the present invention provide an effective solution for managing vehicle operations based on route prediction in order to enhance overall energy efficiency and reduce fuel consumption.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention, wherein.

DETAILED DESCRIPTION

Figure 1:
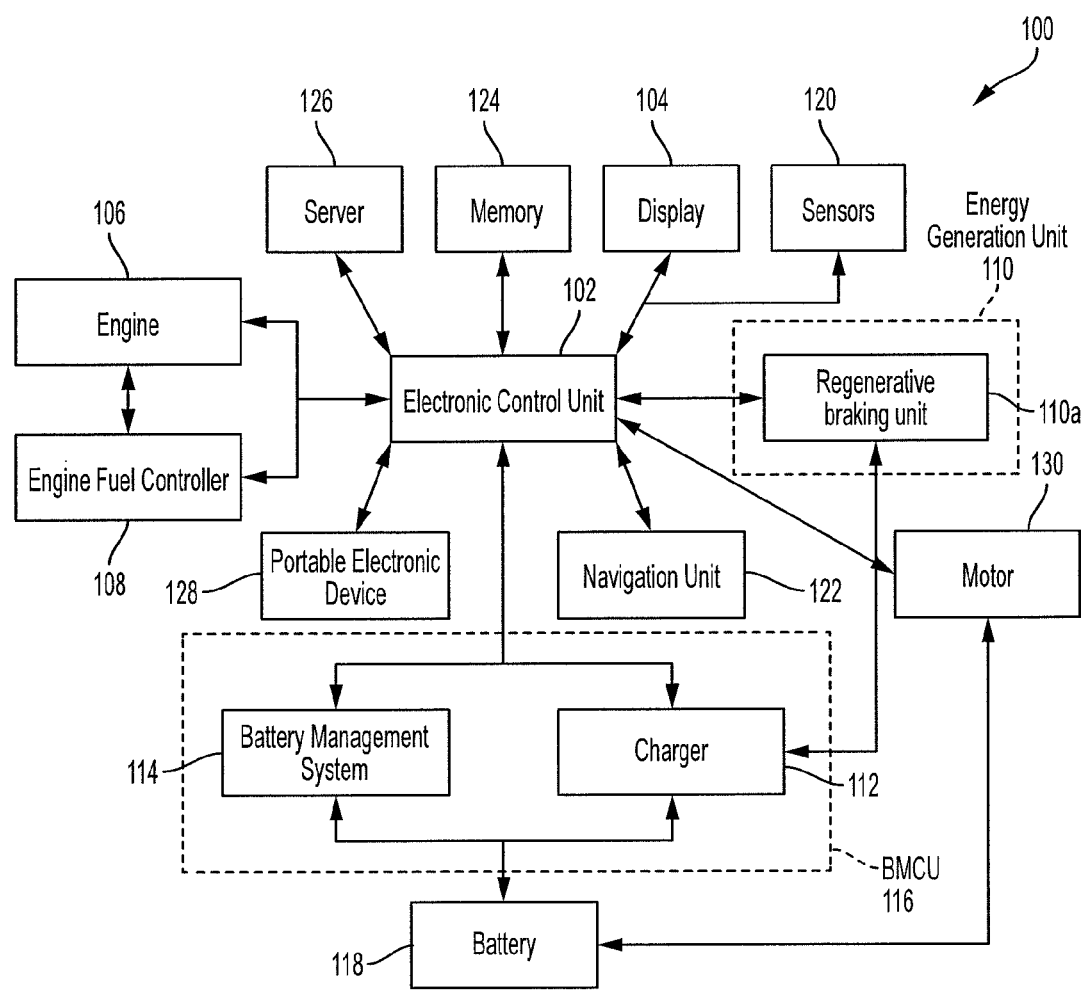
FIG. 1 is a block diagram of a vehicle/system that utilizes route prediction to improve energy efficiency of the vehicle, according to an aspect of the present invention.

The present invention relates to improving energy efficiency of a hybrid vehicle. It is desirable to increase the amount of energy that can be recaptured using an energy generation unit. An important source of regeneration of energy is regenerative braking which can generate a considerable amount of electrical energy that can be stored in a battery of the hybrid vehicle. If the battery has a full state of charge and without a capacity to be charged, then the opportunity to store regenerated braking energy would be missed. The present invention is directed to advantageously learning vehicle operation data during previously driven routes, and utilizing the previously learned vehicle operation data for preventing or at least reducing the duration of an energy inefficient event.

For example, a charging limitation event that occurs during a given identified route can result in an inability of the battery to be charged. The charging limitation event can be stored in the memory and associated with the given identified route. At a later day or time, the system predicts that the vehicle will travel on the route associated with the charging limitation event. As a result, the vehicle will discharge electrical energy in advance to leave an energy storage margin. An advantage of providing the energy storage margin is that the battery will have sufficient capacity to accept regenerative braking energy. The system/method advantageously allows regenerated energy (that would have otherwise been lost due to the charging limitation event) to be stored in the battery and used to power operations of the vehicle. Yet another advantage of the present invention is that fuel consumption is reduced because the energy that is regenerated and stored in the battery can be effectively used to power operations and/or movements of the vehicle.

An exemplary system for optimizing energy efficiency of a hybrid vehicle based on route prediction includes an engine for providing a first amount of power for propelling a movement of the vehicle and a motor configured to utilize electrical energy stored in a battery for providing a second amount of power for a movement of the vehicle. The exemplary system also includes a memory for storing route data and corresponding vehicle operation data. The exemplary system also includes a navigation unit having a processor communicatively coupled to the memory. The processor of the navigation unit is configured to predict, based on the route data, that the hybrid vehicle will travel on a second route after travelling on a first route. The processor of the navigation unit is further configured to predict, based on the vehicle operation data, that the state of charge of the battery will reach or exceed a state of charge threshold value during the second route. The exemplary system also includes an electronic control unit communicatively coupled to the navigation unit and configured to set a target state of charge value for the battery that is less than the state of charge threshold value. The electronic control system is further configured to discharge the electrical energy stored in the battery during at least a portion of the first route based on the target state of charge value, by powering a movement of the vehicle using the motor.

The discussion now turns to interaction of certain elements of a hybrid vehicle 100, as shown in the block diagram of FIG. 1. The hybrid vehicle 100 includes an electronic control unit (ECU) 102, a display 104, an engine 106, an engine fuel controller 108, an energy generation unit 110, a battery management and control unit (BMCU) 116, a battery 118 and sensors 120. The BMCU 116 may include a battery management system (BMS) 114 and a charger 112. The vehicle 100 may be a plug-in hybrid vehicle, having a charger 112 configured to be coupled to an external charger.

The vehicle 100 operates by utilizing a fuel source and a non-fuel source of energy. Various types of fuel may be used by the vehicle 100 including but not limited to gasoline, diesel, ethanol, biodiesel, natural gas, propane, hydrogen or combinations thereof. The non-fuel source of energy includes electrical energy provided by the battery 118 for driving the wheels of the vehicle 100 and/or powering an operation of a device of a vehicle (e.g., a heating, ventilating, and air conditioning (HVAC) unit).

The ECU 102 communicates with the display 104, the engine 106, the engine fuel controller 108, the energy generation unit 110, the BMS 114, the charger 112, the navigation unit 122, the memory 124, the motor 130, and/or their respective controllers using transmission of electronic signals through a Control Area Network (CAN) bus, or via other types of communication links. The ECU 102 may be connected to sensors 120 for detecting various parameters regarding units and/or devices of the vehicle 100. The sensors 120 may include a vehicle speed sensor and a battery temperature sensor.

The ECU 102 may control an operation of one or more motors 130. The motor 130 is powered using charge stored in the battery 118. A battery 118 as used herein may refer to one or more batteries used in conjunction to store electrical energy. The connection between the battery 118 and the motor 130 (and/or other connections shown in FIG. 1) may include inverters and/or converters.

The motor 130 outputs torque to drive the wheels when the engine 106 is in an off state and/or when the engine 106 is in an on state to assist the engine 106 in propelling a movement of the vehicle 100. The amount of output power supplied by the motor 130 may depend on the amount of output power supplied by the engine 106. For example, more power is provided by the motor 130 to meet a given power demand of the driver when less power is provided by the engine 106. The engine 106 and/or the motor 130 may be connected to a transmission for example, via a differential linkage, power splitting mechanisms, and/or various other linkages known in the art.

The motor 130 may include one or more motor-generators. Under certain conditions, at least one of the motor-generators may use battery power to drive the wheels, and at least one of the motor-generators may utilize regenerative braking and/or energy generated by the engine 106 to charge the battery 118.

The battery 118 may provide electrical energy for operation of the vehicle 100. The battery 118 may include one or more rechargeable batteries. The battery 118 may be charged, for example, using a generator or a motor-generator. The battery 118, as in for example, an all-electric or a plug-in hybrid vehicle, may be charged using an external charger coupled to the charger 112 or the battery 118.

The BMS 114 may measure, using battery sensors, parameters that are used to determine the state of charge (SOC) of the battery 118. The battery sensors may measure a voltage, a current, a temperature, a charge acceptance, an internal resistance, self-discharges, magnetic properties, a state of health and/or other states or parameters of the battery 118. The temperature of the battery 118 can be analyzed to determine whether the battery 118 is overheated or overheating. The charging acceptance and the SOC of the battery 118 can be analyzed to determine whether the battery 118 is unable to accept charge due to having a full state of charge.

The SOC may be a percentage or a ratio relative to another predetermined value associated with the battery 118. The ECU 102 may determine an SOC percentage or ratio of the battery 118 based on an energy value stored in the battery 118 relative to the current charging capacity of the battery 118. The SOC may be determined based on the stored energy value relative to a reference capacity stored in the memory 124.

The vehicle 100 includes a navigation unit 122 connected to the ECU 102. The navigation unit 122 may further include a display for interacting with the driver by displaying information as discussed below and/or by accepting inputs, for example, via a touch-screen display. The displayed data described herein may refer to data displayed on the display 104, the display of the navigation unit 122, a display of a portable electronic device 128 (such as smart phone in communication with the processor), and/or combinations thereof.

The navigation unit 122 may access GPS data for route prediction. The navigation unit 122 may be integrated in the vehicle 100 or a separate unit coupled to the vehicle 100 or in communication with the ECU 102. In an embodiment, the navigation unit 122 is integrated in a portable electronic device 128 (e.g., a smartphone or a tablet computer). The navigation unit 122 may include a memory and a processor for performing all or some of the specific steps described herein in conjunction with the ECU 102.

Hereinafter, a "processor" may refer to the ECU 102, the processor of the navigation unit 122, a processor of the portable electronic device 128, another processor, and/or combinations thereof operating in conjunction with one another and configured to perform the steps described herein. For example, some of the steps described herein may be performed by the ECU 102, some of the steps may be performed by the processor of the navigation unit 122, and some of the steps may be performed by the ECU 102 and the processor of the navigation unit 122 communicating and operating in conjunction with one another.

The processor may be connected to a memory 124. In addition, the navigation unit 122 may incorporate a memory connected with the processor or embedded as part of the processor of the navigation unit 122. Hereinafter, the "memory" may refer to the memory 124, the memory of the navigation unit 122, a memory of the portable electronic device 128, a remote memory in communication with the processor, and/or combinations thereof for storing the various information or data used in the predictive process and/or for storing instructions for the steps performed herein. The memory may include off-board memory in communication with the vehicle 100 via wireless communication and/or cloud-based technology.

The discussion now turns to a method of preventing a charging limitation event based on predicted routes and corresponding vehicle operation data. References are made herein to a route set, a route, and a route segment. A route is a collection of connecting segments that describe a single trip. A single trip is between a start event signaling a beginning of the trip and an end event signaling an end of the trip. A route segment or "segment" is a set of sequential position data collected and stored along a trip. A segment is determined based on turning and distance criteria. Each segment has a unique segment identifier, which is linked with other segment identifiers to allow the processor to predict the next segment to be travelled.

In a preferred embodiment, the start route event is when the ignition is turned on, for example, using a key or by pressing a button or other ways of setting the vehicle 100 to an on state. The end route event is when the ignition is turned off, for example, using a key or by pressing a button or other ways of setting the vehicle 100 to an off state. Alternatively, the start/end route event occurs when a door of the vehicle 100 is opened and then shut. The time and/or location of each event may be recorded.

Figure 2:
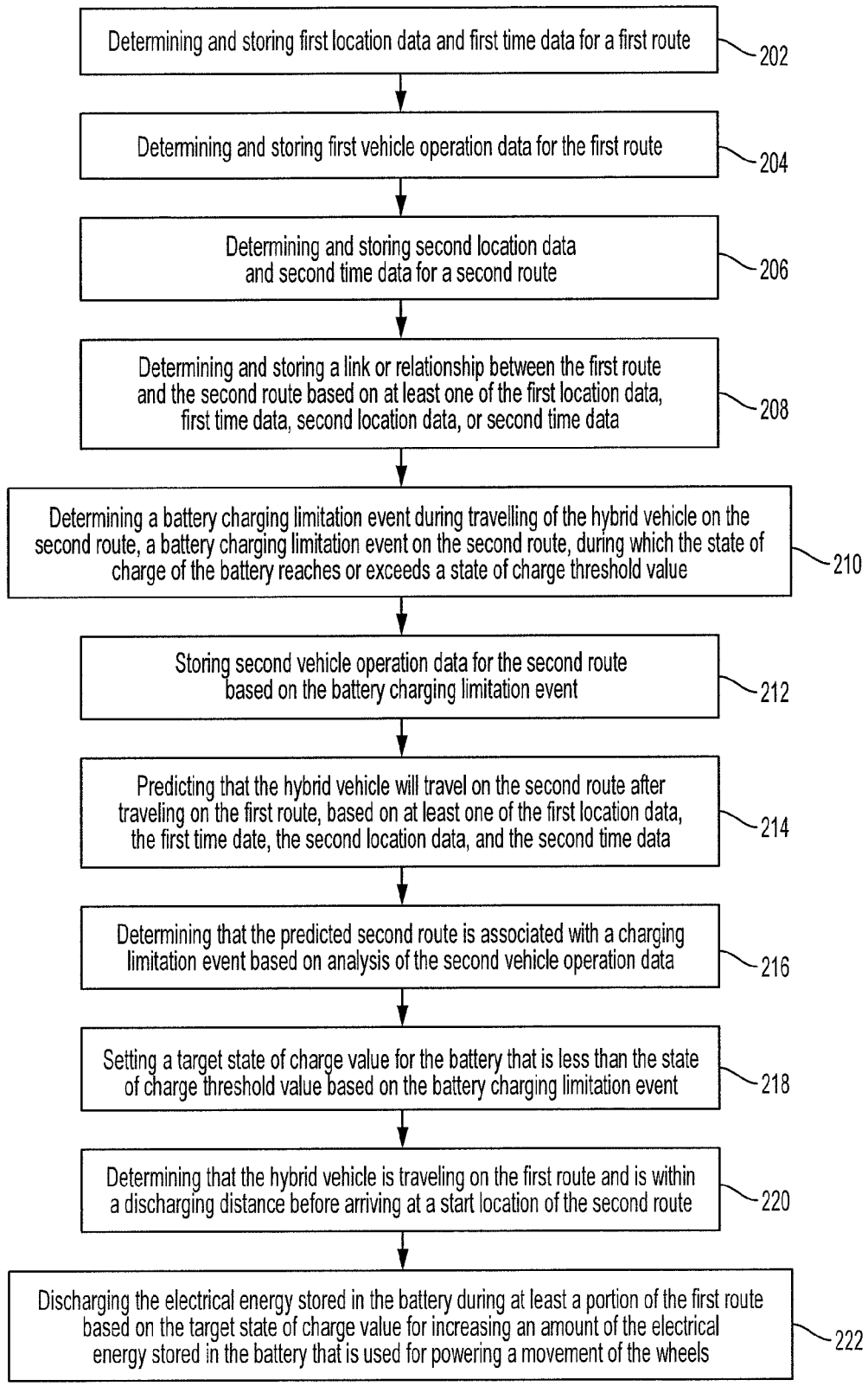
FIG. 2 is a flowchart diagram illustrating a method of preventing a charging limitation event based on predicted routes and corresponding vehicle operation data, according to an aspect of the present invention.

FIG. 2 is a flowchart diagram illustrating a method of preventing a charging limitation event based on predicted routes and corresponding vehicle operation data. Referring to step 202, the processor determines and stores first location data and first time data regarding a first route. The first location data and the first time data are determined using the sensors 120 and/or the navigation unit 122. The first location data may include the start and end locations of the first route. The first time data may include the start and end times of the first route in the memory 124. The processor assigns the first route a unique route identifier during or after the first time that the first route is driven. The first route includes one or more route segments. Each route segment has a unique route segment identifier. The first route may be linked with one or more other routes to form a route set.

Alternatively or in addition to start/stop locations and times, distance information regarding the first route can be stored in the memory. The travelled distance on a route segment may be determined by integrating vehicle speed and/or determining distance between GPS locations. The distance values may be summed to obtain a distance of a route that includes a plurality of segments.

Figure 3A:
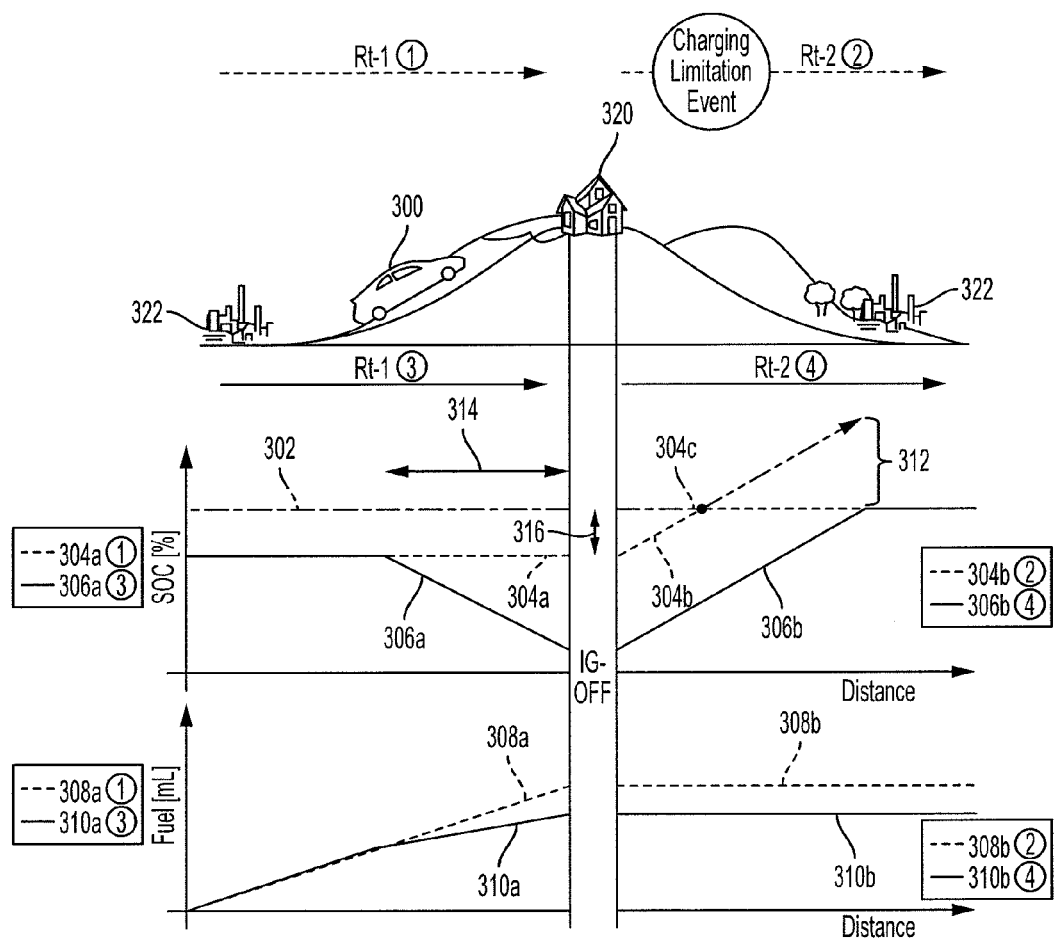
FIG. 3A shows an example of fuel consumption of a vehicle and the state of charge of a battery as the vehicle travels over two routes, according to an aspect of the present invention.

FIG. 3A shows an example of fuel consumption of a vehicle 300 and SOC of a battery 118 as the vehicle 300 travels over two routes. The first route (denoted by "Rt-1") includes travelling from a work place 322 located in a city to home 320, which is located on a hill. The first route (Rt-1) includes a significant amount of uphill driving.

Figure 3B:
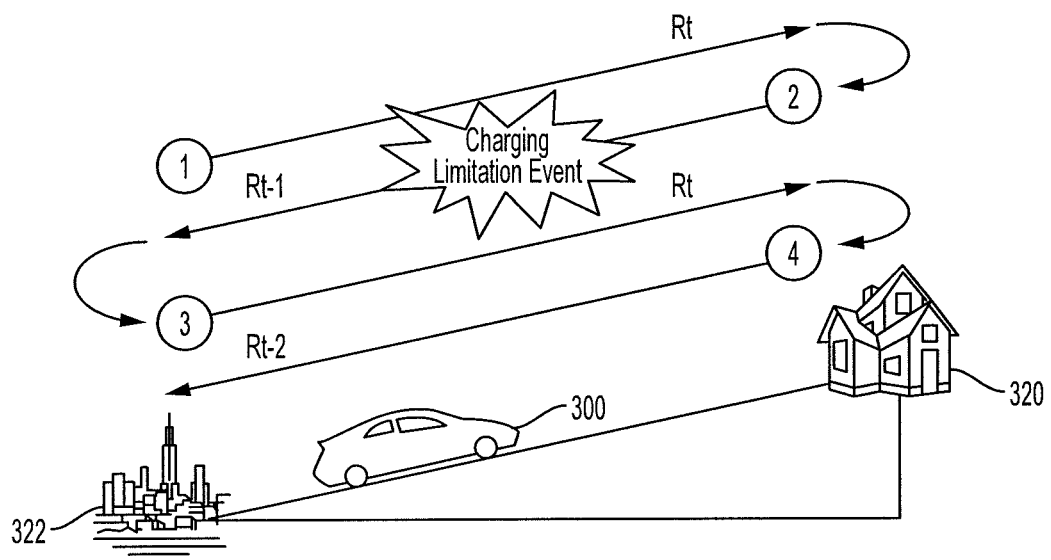
FIG. 3B shows two routes that are driven twice each in order to illustrate an example of advantages of the method of the present invention.

FIG. 3B refers to the same example as shown in FIG. 3A, yet illustrates further the trips that the vehicle 300 travels. During trip (1), Rt-1 is driven, and then the next morning, the second route (Rt-2) is driven in trip (2). Sometime after driving Rt-2, Rt-1 is driven again (trip (3)). During trip (4), Rt-2 is driven again after Rt-1.

In a preferred embodiment, route prediction and storage of route data and corresponding vehicle operation data are performed by the processor of the navigation unit 122. Vehicle operation detection and control are performed by the ECU 102. Under the foregoing configuration, the processor of the navigation unit 122 performs step 202.

Referring to step 204, the first vehicle operation data is determined and stored. The first vehicle operation data is associated with the first route. Table 1 provides an example of database entries stored in the memory. In a preferred embodiment, the entries are stored in a memory of the navigation unit 122. Alternatively, the entries are stored in the memory 124 which is communicatively coupled to the ECU 102, as set forth above with respect to FIG. 1.

Table 1 shows the status of database stored in the memory 124 after completion of trip (1). Route identifier 1 is assigned to the first route (Rt-1). "Rt-1 (Learned)" indicates that the processor has learned location data, time data, and vehicle operation data about the first route. Storing the first vehicle operation data includes setting a charging limitation event flag to "0", "NO" or inactive, indicating that there was no charging limitation event on the first route. In the example shown in FIGS. 3A and 3B, because the vehicle 300 has travelled uphill over a significant distance, there is no charging limitation event. In other words, there is no charging limitation event because a significant amount of the electrical energy of the battery 118 is consumed which is not compensated by regenerated braking energy. The next route list includes all zeros because the first and second routes are being driven for the first time, and the processor is unaware of future routes at this juncture.

TABLE 1

| (1) | Route Identifier 1 | Route Identifier 2 | Route Identifier 3 | ... |
|---|---|---|---|---|
| | Rt-1 (Learned) Charging Limitation Event = NO Next Route List = 0, 0, 0, 0, 0 | (empty) | (empty) | (empty) |

Referring to FIG. 3A, the SOC of the battery 118 during trip (1) is denoted by 304a. The horizontal line 302 indicates the SOC threshold value at which the battery 118 would no longer be able to be charged using regenerated energy (for example, regenerated braking energy). During trip (1), there is no battery charge limitation event because the SOC level 304a remains less than the SOC threshold value 302.

Referring to FIGS. 3A and 3B, after the first route, "IG-OFF" event occurs. "IG-OFF" indicates that the ignition is set to an off state, and as a result, the vehicle 300 is set to an off state. For example, this event occurs because the driver arrives home 320, and shuts off the vehicle 300. The next morning, the second route (Rt-2) is driven from home 320 to work place 322. Rt-2 may or may not include the same route segments as Rt-1. For example, the driver may take other avenues downhill on the second route as compared with the uphill drive the night before on the first route.

In one embodiment, determination of the first vehicle operation data (step 204) is performed by the ECU 102. The ECU 102 may communicate with the processor of the navigation unit 122 in order to prompt the navigation unit 122 to associate the first vehicle operation data with the first route identifier stored in the memory.

Referring to step 206, the second location data and the second time data for the second route are determined, similarly to step 202 described above. The second location data and the second time data may include start/end location and start/end time of the second route. This step can be performed by the navigation unit 122 as discussed above regarding step 202.

Referring to step 208, a link or relationship between the first route and the second route is stored based on at least one of the first location data, the first time data, the second location data or the second time data. In a preferred embodiment, this step can be performed by the navigation unit 122.

Table 2 shows an example of a link or relationship stored between the first route and the second route. Table 2 shows the status of the database stored in the memory 124 after completion of trip (2). The next route list indicates the routes that have been previously driven after the route indicated in the column. Because Rt-2 is driven after Rt-1, Rt-2 is added as the next route for Rt-1. The zeros ("0") indicate empty entries, meaning that no other route has been previously driven after Rt-1. In this example, the entries of the next route list do not indicate subsequent routes that occur after the next route. Rather, they indicate routes that have been previously driven next after Rt-1. A circular buffer of five entries is shown, which holds the last 5 routes that were driven after Rt-1. When the 5 entries are not empty, the next route is recorded, and the oldest entry is deleted, in order to maintain the database updated. The buffer may have more or less number of entries based on design concerns. Further factors can be considered to assign weights to candidates as discussed in further details below with respect to FIG. 4A.

TABLE 2

| (2) | Route Identifier 1 | Route Identifier 2 | Route Identifier 3 | ... |
|---|---|---|---|---|
| | Rt-1 Charging Limitation Event = NO Next Route List = Rt-2, 0, 0, 0, 0 | Rt-2 (Learned) Charging Limitation Event = YES Next Route List = 0, 0, 0, 0, 0 | (empty) | (empty) |

Referring to step 210 of FIG. 2, the processor determines whether there is a battery charging limitation event during travelling of the hybrid vehicle on the second route (Rt-2) (trip (2)). Because the second route is downhill, there is significant deceleration, resulting in a significant opportunity for storage of electrical energy in the battery 118. The processor determines whether there is a battery charging limitation event on the second route. During a battery charging limitation event, the SOC of the battery 118 reaches or exceeds an SOC threshold value.

Referring to FIG. 3A, the SOC of the battery 118 during the first time that the second route is driven (trip (2)) is denoted by 304b. The SOC level 304b does not exceed the SOC threshold value 302. As a result, after travelling downhill beyond the point 304C, regenerated energy cannot be stored in the battery 118. This effect is undesirable because the regenerated energy cannot be stored in the battery 118 for powering current or future operations of the vehicle. If the battery 118 had sufficient capacity, the regenerated energy could have been stored for powering a future movement of the vehicle or an operation of an auxiliary device of the vehicle (e.g., heating, ventilation, and air conditioning (HVAC) unit). The energy that could have been stored in the battery 118 and used for powering vehicle operations would need to be compensated for by the engine 106. As a result, the fuel consumption level 308b is relatively high.

The charging limitation event is stored in the memory when the processor determines that an inability of the battery 118 to store the electrical energy is due to the SOC of the battery 118 reaching or exceeding the SOC threshold value 302 and not due to the overheating of the battery 118. The determination is based on at least the SOC of the battery 118 (304b) and the battery temperature.

The system/method of the present invention advantageously distinguishes between causes of an inability of the battery 118 to be charged. The ECU 102 may communicate with the BMS 114 and/or a battery temperature sensor (a part of sensors 120 as set forth above with respect to FIG. 1). The ECU 102 determines whether the battery 118 is overheated. For example, the ECU 102 determines that when the temperature is within a normal operating range as defined by temperature thresholds, then the battery 118 is not overheated. The ECU 102 determines that when (a) the battery 118 is unable to be charged as indicated by a battery power charging limitation value, (b) the temperature is within the normal operating range, and (c) the SOC of the battery 118 is at or in proximity of the SOC threshold value 302, then there is a charging limitation event that is due to a high SOC value and not due to battery overheating. If so, a charging limitation event flag is set accordingly and stored in the memory as shown in Tables 1-4.

Using the foregoing method, the ECU 102 does not deplete battery charge unless it would be helpful to do so for preventing or reducing duration of a future charging limitation event. If the battery 118 is overheated, depleting the battery charge would not address the overheating. Rather, battery temperature management logic can be activated during future travelling on Rt-1, in order to prevent the battery overheating event. The battery temperature management logic would ensure that the battery temperature is low (less than a battery temperature threshold) in advance of reaching the battery overheating event on Rt-2.

Referring to step 212 of FIG. 2, the second vehicle operation data is stored for the second route based on the battery charging limitation event. As shown in Table 2 above, the charging limitation event is set to YES, "1," or "active" and stored in the memory 124. Next route list includes all zeros because the processor is not yet aware of the next route that is driven after the second route.

In the example described in Tables 1-4, one type of charging limitation event (corresponding to a high level of SOC or "SOC overflow") is recorded. In another embodiment, different types of events corresponding to the inability of the battery 118 to accept charge can be stored. For example, the charging limitation event can have two or more values, each indicating the cause (e.g., high SOC, overheating, etc.). Using the foregoing approach, the appropriate vehicle operation control can be adopted during the next time Rt-1 is travelled.

The charging limitation event can be stored when it occurs on a beginning distance/time threshold from the start location/time of the second route. The distance/time threshold can be predetermined (for example, a few hundred feet or a few miles or a few minutes from the start location of the second route). Alternatively, the processor may determine whether the charging limitation event should be stored as an event that would prompt preparation on the previous route (Rt-1). If the charging limitation event occurs too far away (measured in distance and/or time) from the start of Rt-2, then there may be sufficient opportunity to deplete the battery charge during the beginning part of Rt-2. As such, the processor would store the charging limitation event as an event that would require preparation during the previous route if the charging limitation event occurs within a beginning distance/time of the start location/time of Rt-2.

Furthermore, the processor may not store the charging limitation event as an event which would require preparation in the previous route if the portion of the route from start time/location to the charging limitation event is not downhill. The reason is that in semi-flat or uphill portions, battery charge can be adequately discharged if the distance exceeds a certain threshold such that there is an adequate opportunity for consuming electrical energy to propel movement of the vehicle 100. The grade does not necessarily need to be detected because electrical energy consumption and/or overall energy consumption over the distance (which includes fuel consumption) between start location and the charging limitation event would be typically indicative of the grade. Determining overall energy consumption value and/or electrical energy consumption advantageously would be further indicative of consumption by auxiliary units. Alternatively or in addition, the grade over the distance can be examined using GPS data and/or a grade sensor. Based on the foregoing factors, the processor determines whether to store the charging limitation event.

Determination of the second vehicle operation in step 210 is performed by the ECU 102. In step 212, the ECU 102 may communicate with the processor of the navigation unit 122 in order to associate the second vehicle operation data with the second route stored in the memory.

In the example provided above, steps 202 and 204 with respect to the first route were described generally because no charging limitation event occurred on the first route. Steps 206-212 related to the second route were described in further details because there was a charging limitation event on the second route. A similar analysis/determination is performed for each predicted next route. For each next route, the processor determines whether there is a corresponding charging limitation event and further determines the appropriate vehicle operation control to improve energy efficiency.

As denoted by trip (3) in FIG. 3B, at some time after driving Rt-2, the vehicle travels on Rt-1 again. Referring to step 214 of FIG. 2, the processor predicts that the vehicle will travel on the second route (Rt-2) after Rt-1. The prediction may be performed when the processor determines that the vehicle is travelling on Rt-1. This predication is based on at least one of the first location data, the first time data, the second location data, and the second time data. In the example provided above, there is only one candidate Rt-2 as shown in Table 2 for the route that will be travelled after Rt-1. As a result, the processor predicts that Rt-2 will be driven after Rt-1. The prediction can be performed by the processor of the navigation unit 122 and the result of the prediction can be communicated to the ECU 102.

Referring to step 216 of FIG. 2, the processor retrieves the second vehicle operation data from the memory. The second vehicle operation data includes the charging limitation event. The processor determines that a charging limitation event occurred previously while travelling on the second route, as indicated in Table 2. The ECU 102 retrieves and analyzes the second vehicle operation data to prevent or reduce the duration of the previously occurred battery charging limitation.

Referring to step 218 of FIG. 2, the processor sets a target SOC value for the battery 118 that is less than the SOC threshold value 302. The SOC threshold value 302 refers to 100% of capacity or another value at which the battery 118 is fully charged and unable to accept additional charge for storage. The SOC threshold value 302 may be set to the maximum capacity of the battery 118 (100%) or may be set to a value less than absolute full charge (e.g., 90%-100%) based on design concerns such as battery SOC and health management concerns.

The difference between the SOC threshold value and the target SOC value is referred to herein as an energy storage margin. The energy storage margin allows the battery 118 to be charged before reaching the SOC full charge threshold value. The method of the present invention advantageously provides an adequate energy storage margin at the start of the second route, to prevent or at least reduce the duration of the charging limitation event.

In an embodiment, the target SOC value may be set to a pre-determined value. For example, the target SOC value may be in the range of about 45%-55% to provide an adequate energy storage margin at the start of the second route. For example, the target SOC value may be set to 50%. Alternatively, the target SOC value may be dynamically set based on characteristics of the battery charging limitation event. The target SOC value may be set such that during the second route, the SOC eventually reaches a value close to the SOC threshold value 302 but not reach or exceed it. The processor may periodically or continuously monitor and manage discharging of the electrical energy in order to reach the target SOC value at the end of the first route (Rt-1).

Table 3 shows the status of database stored in the memory after completion of trip (3).

TABLE 3

| (3) | Route Identifier 1 | Route Identifier 2 | Route Identifier 3 | ... |
|---|---|---|---|---|
| | Rt-1 (Predicted) Charging Limitation Event = NO Next Route List = Rt-2, 0, 0, 0, 0 | Rt-2 Charging Limitation Event = YES Next Route List = Rt-1, 0, 0, 0, 0 | (empty) | (empty) |

Referring to step 220 of FIG. 2, the processor determines the hybrid vehicle is traveling on the first route (Rt-1) and is within a discharge distance before arriving at a start location of the second route (Rt-2). Because this determination is dependent upon route data, this step can be performed by the processor of the navigation unit 122. Once the vehicle is within the discharge distance, the processor of the navigation unit 122 may output a signal to the ECU 102, indicating that an SOC discharge distance flag is set to 1, active, or yes.

The discharge distance and/or the target SOC value can be determined dynamically based on a distance between a start location of the second route and a location of the charging limitation event. If the charging limitation event is far away from the start location of Rt-2, there is an adequate opportunity for discharging electrical energy during the beginning part of Rt-2. For example, a vehicle operation management logic that operates within a route and based on route segments of the route can manage vehicle operations to discharge electrical energy. Under the foregoing condition, there would not be a need for discharging electrical energy far in advance to reach a relatively low SOC prior to completion of Rt-1. As such, the target SOC value would not need to be set at a low value, and the discharge distance would be relatively short. In addition or alternatively, the discharge distance and the target SOC value can be determined dynamically based on a time period between a start time of the second route and a time at which the SOC of the battery 118 will reach or exceed the target SOC value.

The discharge distance and/or the target SOC value can be based on the amount of SOC overflow during the charging limitation event. In addition or alternatively, the discharge distance can be determined dynamically based on a duration or distance during which the SOC of the battery 118 will reach or exceed the target SOC value. If the discharging event is prolonged, there is a greater need for discharging of the battery 118. As a result, the target SOC value is set to be lower and/or the discharge distance is set to be greater to start depleting at an earlier point or stage in Rt-1. For example, the processor takes into consideration the duration and/or distance during which (a) the SOC is at or above the SOC charging threshold 302 and (b) regenerative braking energy for storage was available.

As set forth above, the discharge distance and/or the target SOC value can be based on an amount of energy that could have been generated and stored in the battery 118. The ECU 102 can determine the lost energy based on braking torque demand. A brake pedal sensor indicates braking torque demand. A portion of the braking torque demand is used by regenerative braking, and the remainder, if any, is met by regenerative braking. When the battery 118 is full, the braking torque demand will be met by friction brakes. A brake controller can estimate the amount that should be available for regenerative braking based on the negative torque demand. When the battery 118 is full, the brake controller sends a signal to the ECU 102 indicating that regenerated energy cannot be stored in the battery 118. Instead, the brake controller uses friction braking to meet the negative torque demand. Based on the braking torque demand and the duration/distance over which the brake controller indicates that regenerated braking energy cannot be stored, the ECU 102 estimates the energy that could have been stored in the battery 118 using regenerative braking. The target SOC and the discharge distance can be set based on the amount of energy that could have been stored. For example, the target SOC value and the discharge distance can be determined using a look-up table that has the amount of energy that could have been stored as an entry.

Referring to step 222 of FIG. 2, the processor controls discharging of the electrical energy stored in the battery 118 during at least a portion of the first route (discharge distance 314). The discharging operation is performed to achieve the target SOC value. As a result, the amount of electrical energy consumed for moving the vehicle is increased prior to reaching Rt-2.

Referring to FIG. 3A, the SOC value 306a and the fuel consumption value 310a are shown for trip (3). The fuel consumption in trip (3) (denoted by 310a) is significantly lower than the fuel consumption in trip (1) (denoted by 308a) because additional electrical energy is used to propel movement of the vehicle 300. The SOC value 306a in trip (3) is decreased over the discharge distance 314, whereas in trip (1) the SOC value 304a remained substantially constant and at a higher level.

As a result, at the beginning part of trip (4) (when Rt-2 is driven for the second time), the energy storage margin 316 is available. This allows the battery 118 to store regenerated energy (for example, via regenerative braking). As a result, the energy portion denoted by 312 is not lost (as compared with trip (2)). This effectively enhances energy efficiency and the ability of the vehicle to regenerate energy. The regenerated energy that would have been lost (312) due to the charging limitation event can be advantageously used to power operations of the vehicle 300. The fuel consumption in trip (4) (denoted by 310*b*) is significantly lower as compared with the fuel consumption in trip (2) (denoted by 308*b*).

As the vehicle 300 travels closer to the end point of Rt-1 (home 320), the processor may continuously or periodically monitor the SOC level to ensure that the SOC reaches the target SOC value in order to provide an adequate energy storage margin. In an embodiment, the processor determines whether the method under-compensated the SOC value by leaving insufficient margin such that the SOC level eventually reached or exceeded the SOC threshold value. Furthermore, the processor can determine whether the method over-compensated the SOC value by leaving too great of a margin such the SOC level was eventually less than the SOC threshold value by a considerable margin. Data regarding over compensation and/or under compensation can be associated with the route data (e.g., stored in a table similar to Tables 1-4). This allows the processor to fine-tune the SOC management during subsequent times that the vehicle travels over the first route.

Table 4 shows the status of database stored in the memory after completion of trip (4).

TABLE 4

| (4) | Route Identifier 1 | Route Identifier 2 | Route Identifier 3 | . . . |
|---|---|---|---|---|
| | Rt-1<br>Charging<br>Limitation<br>Event = NO<br>Next Route List =<br>Rt-2, Rt-<br>2, 0, 0, 0 | Rt-2 (Predicted)<br>Charging<br>Limitation<br>Event = YES<br>(no change)<br>Next Route List =<br>Rt-1, 0, 0, 0, 0 | (empty) | (empty) |

Note that in this embodiment, the charging limitation event is not set back to NO, "0," or inactive, despite the fact that the charging limitation event did not occur during trip (4) as a result of the vehicle operation management. If the event is reset back to NO, "0," or inactive, then the ECU 102 would not deplete the electrical energy during Rt-1, under the false impression that there is no charging limitation event problem with Rt-2. In other words, once the charging limitation event is set to YES, "1," or active, it remains in that state. In another embodiment, the processor utilizes decaying control logic to set the charging limitation event back to NO, "0," or inactive if the processor determines that it is likely that the charging limitation event will no longer occur during subsequent times that the second route (Rt-2) is travelled.

Figure 4A:
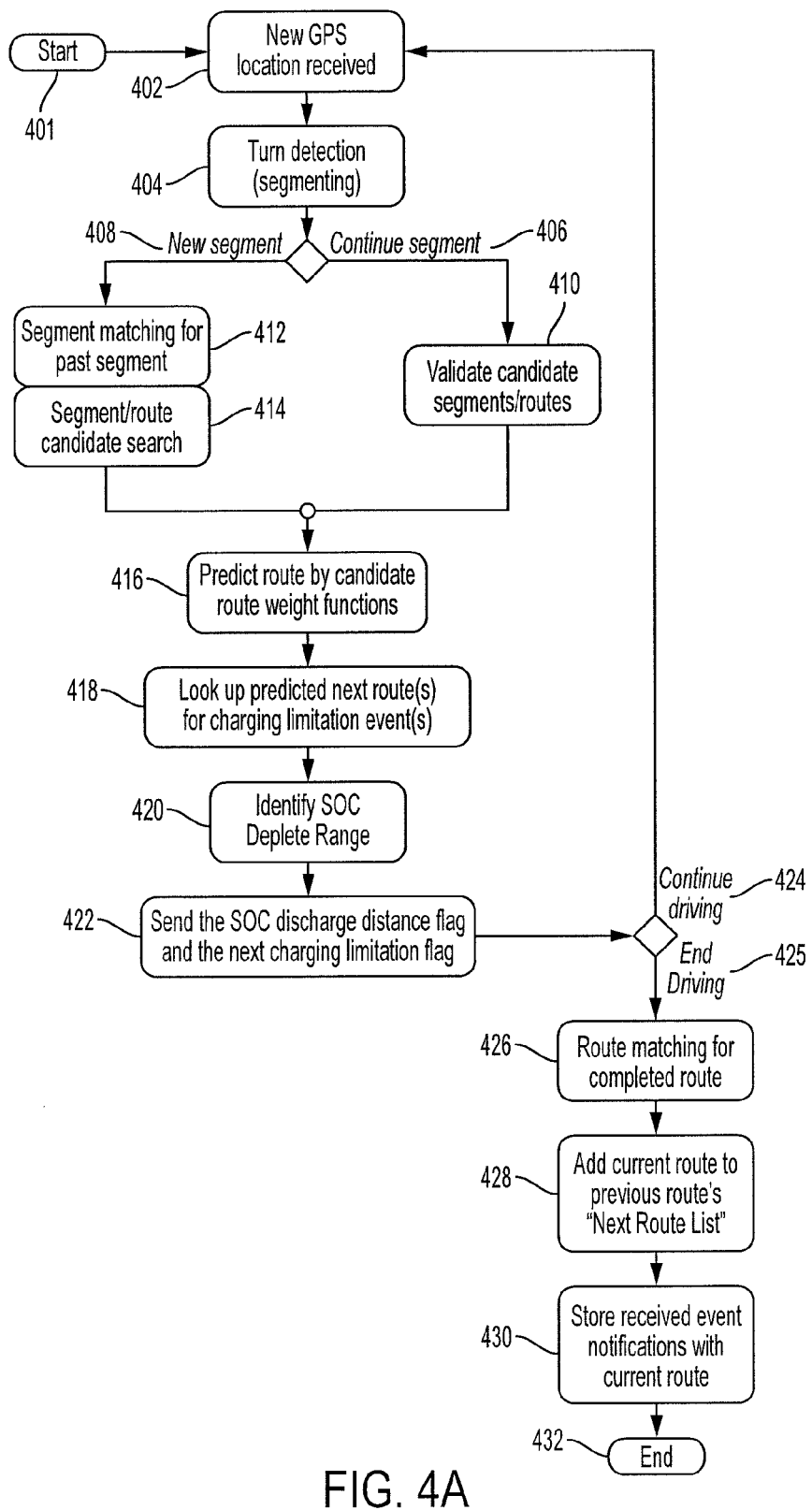
FIG. 4A shows a method of predicting routes and associating vehicle operation data with the routes, according to an aspect of the present invention.
Figure 4B:
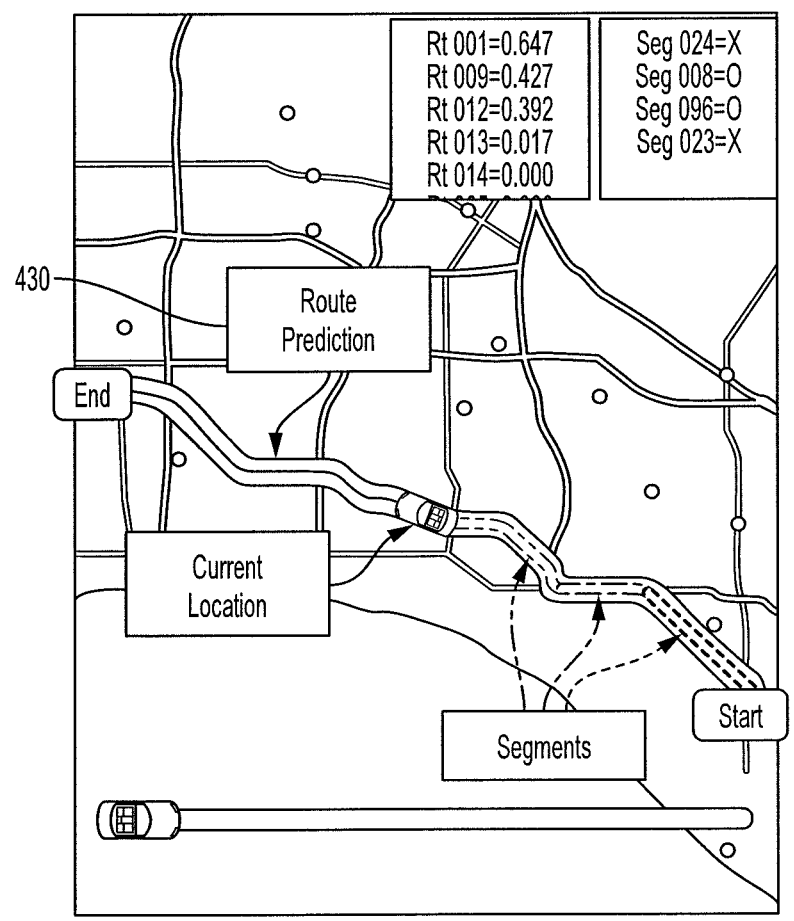
FIG. 4B illustrates an example of a map having a route with multiple route segments, according to an aspect of the present invention.

Referring to FIG. 4A, a method of route prediction performed by a navigation unit 122 is shown. Step 401 indicates a starting point for the operations of the algorithm. Referring to step 402, the processor of the navigation unit 122 receives a new/current GPS location. Referring to step 404, as the vehicle travels 100, the turns are detected and the route segments are identified. An example of a map having a route with multiple route segments is shown in FIG. 4B. As the vehicle 100 travels on a route, GPS coordinates of locations on the route may be recorded and/or time-stamped. Using the location data and/or the time data, the processor may differentiate between various route segments and store data regarding the route segments. A new route segment may begin when the vehicle 100 makes a new turn (as determined, for example, by the heading data and/or changes in latitude and longitude), and when the turn angle is sharp enough to exceed a turn threshold value. For example, in city driving, as the vehicle 100 turns into different streets, each of the streets may be stored as a route segment. Both turn detection and GPS map data (for example, information about terrains and/or street characteristics) may be utilized for differentiating between route segments and/or for storing information regarding the route segments.

Furthermore, driving time may be compared to a driving time threshold to divide routes into various route segments. For example, if a long road is driven for 100 miles (roughly 161 km) without making any turns, the 100-mile (161 km) drive may be broken up into different route segments. For example, every 5 miles (8 km) or 10 miles (16 km), the route may be segmented in order to form a new route segment. The threshold values are presented merely as examples for illustration of the route segmentation process. Other thresholds and different parameters may be utilized to divide the routes based on design concerns or criteria.

Referring to FIG. 4A, as a result of the segmenting turn detection (segmenting) of step 404, a new segment is formed (step 408), or the processor determines that the vehicle is continuing to travel on the currently identified segment (step 406). In order to improve data storing efficiency, the route data can be saved discretely. For example, a part of a street may be a part of a number of different routes depending on which way the vehicle 100 turns. A route segment can be used for multiple routes without inefficiently re-recording the route segment. A route list and a route segment list are stored in the memory, and each route data entry may include a route identifier and an ordered list of route segments.

Based on the criteria discussed above with respect to step 404, the processor determines that the vehicle is continuing along a currently identified segment (step 406) or that the vehicle is travelling on a new segment (step 408). Referring to step 410, when the vehicle is travelling along a route segment and/or route, the processor validates candidate route segments and/or routes. The processor confirms that the vehicle is travelling along the currently determined route segment and route.

Referring to step 412, when the processor determines that the vehicle is travelling on a new route segment, the processor searches the database to match the previously travelled route segment. Referring to step 414, previously travelled route segments indicate a route segment identifier of a candidate segment to be travelled next. In other words, steps 412 and 414 allow the processor to determine the route segments that have been travelled after the past route segment and identify candidate route segments that will likely be travelled next. This allows the processor to predict next route segments and routes.

Referring to step 416, the processor predicts routes that will be travelled as set forth above. The prediction of the next route can be based at least in part on the number of entries. For example, if the next route list is "Rt-2, Rt-2, Rt-3, 0, 0," the processor may determine that the likelihood that the vehicle will travel on the second route is greater than the likelihood that the vehicle will travel on a third route (which was previously driven after Rt-1 once). Other probability-based control logics can be utilized as set forth below.

The processor may calculate a route weight for each identified route candidate. The route weight may be based on the start/end times, start/end locations, current time, current day of the week, the ratio of the number of times the identified candidate route was travelled to the total number of times any of the candidate routes were travelled, various other factors, and/or combinations thereof. For example, the processor may consider what time of day the route candidate was driven usually in comparison to the current time. The route weight may be a weighting function based on the foregoing corresponding data. Consider an example in which a route (Rt-4) corresponds to driving from home to a work place on Mondays to Thursdays, and another route (Rt-5) is driven from home to gym on Fridays, and then from the gym to work place (Rt-6). Rt-4 and Rt-5 each occur next after a route from work to home during the previous night. If the current day and time indicate that it is a Friday and the route from work to home was travelled the night before, the processor would determine that the probability weight for Rt-5 is higher than Rt-4 despite the fact that Rt-4 has been driven more than Rt-5.

Referring to step 418, the processor will access vehicle operation data corresponding to the route identifiers of the predicted next routes. If any of the next routes has been previously associated with a charging limitation event, the processor of the navigation unit 122 sends a signal to the ECU 102 indicating so. For example, the processor of the navigation unit 122 may set a next charging limitation event flag to "1," "YES," or active. This would indicate that the predicted next routes have a corresponding charging limitation event.

The next charging limitation event flag is set to "1," "YES," or active when the candidate route(s) that is predicted to be the most likely next route(s) has/have a corresponding charging limitation event. Accordingly, the ECU 102 prepares to discharge the electrical energy of the battery 118 during the current route once the vehicle is within the discharge distance.

Referring to step 420, the processor of the navigation unit 122 estimates the distance from the current position to the predicted route's final destination. If this distance is less than the discharge distance, then the processor of the navigation unit 122 sets an SOC discharge distance flag to "1," "YES," or active. If the vehicle is not travelling within the discharge distance, the SOC discharge distance flag is set to "0," "NO," or inactive.

Referring to step 422, the processor communicates the next charging limitation event flag and SOC discharge distance flag to the ECU 102. The ECU 102 will manage discharging of the electrical energy stored in the battery 118 when the SOC discharge distance flag is set to "1," "YES," or active and next charging limitation flag is set to "1," "YES," or active. This means that the next route has a corresponding charging limitation event and the vehicle 100 is currently travelling within the discharge distance.

Referring to step 424, as the vehicle 100 continues to be driven on the current route, the process proceeds to step 402 in order to re-perform steps 402-422 based on new GPS location. Referring to step 425, once the vehicle ends driving on the current route, the completed route is matched with a route previously stored in the database if an entry was previously made for the current route. If the current route was not previously stored, a new route entry can be created, as discussed above with respect to Table 1.

Referring to step 428, the current route is added to the previous route's next route list as discussed above with respect to Tables 1-4. Referring to step 430, the received event notifications are stored and associated with the current route. For example, as discussed above with respect to Tables 1-4, the current route's charging limitation event flag may be updated depending on whether the ECU 102 detected a charging limitation event associated with the current route.

Figure 5:
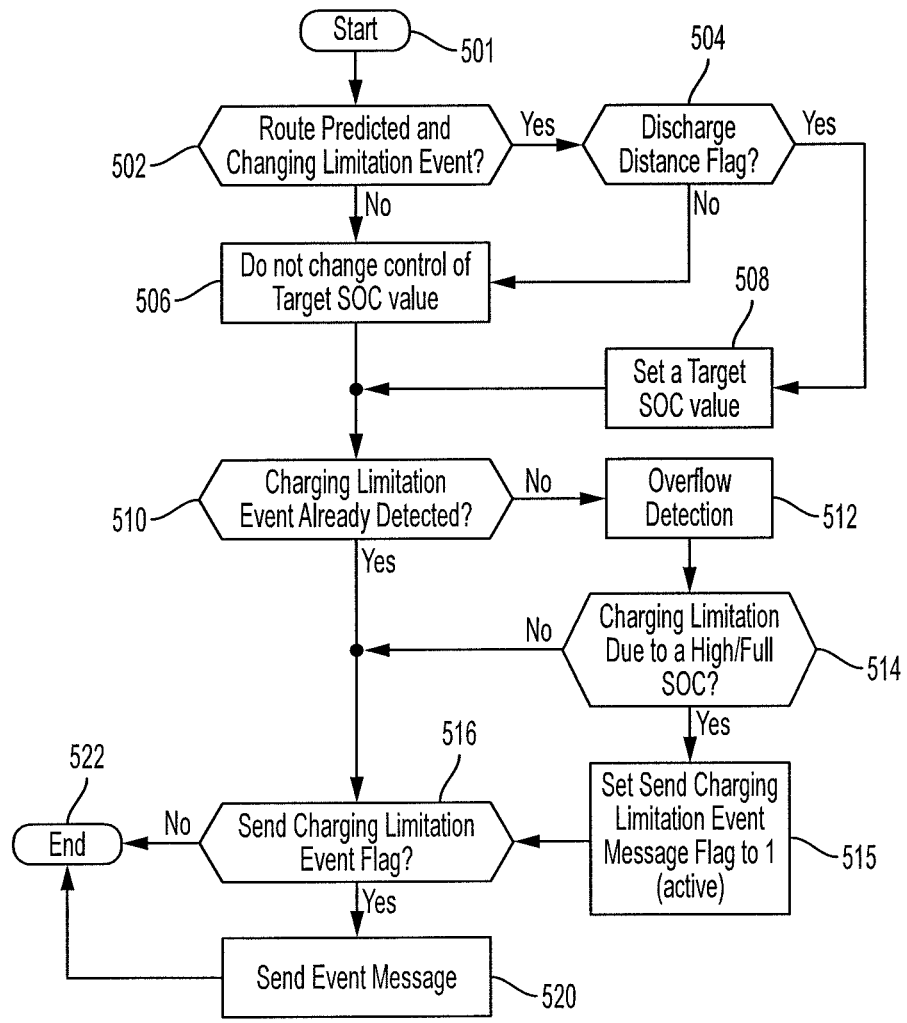
FIG. 5 is a flowchart diagram illustrating a method of preventing a charging limitation event based on a route prediction algorithm and using an electronic control unit of a hybrid vehicle, according to an aspect of the present invention.

FIG. 5 is a method of preventing or reducing the duration of a charging limitation event based on a route prediction algorithm. In a preferred embodiment, the steps shown in FIG. 5 are performed by an ECU 102, and steps in FIG. 4 are performed by the processor of the navigation unit 122. The two series of steps complement one another to manage vehicle operations based on route prediction results.

Step 501 indicates the start of performance of the steps shown in FIG. 5. The steps can be initiated periodically and/or triggered by the processor. By way of a non-limiting example, the steps may be repeated every 8 milliseconds.

Referring to step 502, the ECU 102 determines whether the next route is predicted and whether the next route has a corresponding charging limitation event. Referring to step 506, if the next route is not predicted or the next route is not associated with a charging limitation event, then there is no need for the logic to discharge the battery 118 in advance of the second route. As a result, the logic does not change control of the target SOC value. The target SOC value can instead be controlled by a base logic or another logic.

Referring to step 508, if however the predicted next route has a corresponding charging limitation event and the discharge distance flag is set to 1, then the ECU 102 sets a target SOC value. The target SOC value can be predetermined or dynamically determined as set forth above with respect to step 218 of FIG. 2. The ECU 102 controls the SOC of the battery 118 based on the target SOC in order to discharge the electrical energy stored in the battery 118 as discussed above with respect to step 222 of FIG. 2. The motor 130 may utilize electrical energy stored in the battery 118.

Referring to step 510, the ECU 102 determines whether the charging limitation event is already detected. If so, there may be no need for repeating the detection of a charging limitation event, and the process proceeds to step 516. If a charging limitation event is not associated with the current route, the process proceeds to step 512 to determine if there is an SOC overflow or charging limitation event.

Referring to step 514, the processor determines whether the charging limitation event is due to reaching a high/full SOC value, as discussed above with respect to step 210 of FIG. 2. If the inability of the battery 118 to be charged is due to a high/full SOC value, the Send Event Message Flag is set to 1 or active (step 515). The processor determines whether the Send Event Message Flag is set to 1 (step 516). When the charging limitation flag is active (set to 1), the ECU 102 transmits a message to the processor of the navigation unit 122 indicating so accordingly (step 520). The processor of the navigation unit 122 populates database entries accordingly as set forth above with respect to Tables 1-4.

As set forth above, the ECU 102 communicates with the processor of the navigation unit 122 to receive updated message(s) including the route identifier, next charging limitation event flag, and discharge distance flag. Further, the ECU 102 communicates with the processor of the navigation unit 122 to send the event message that indicates the charging limitation event flag for storage in the memory (Tables 1-4).

Figure 6:
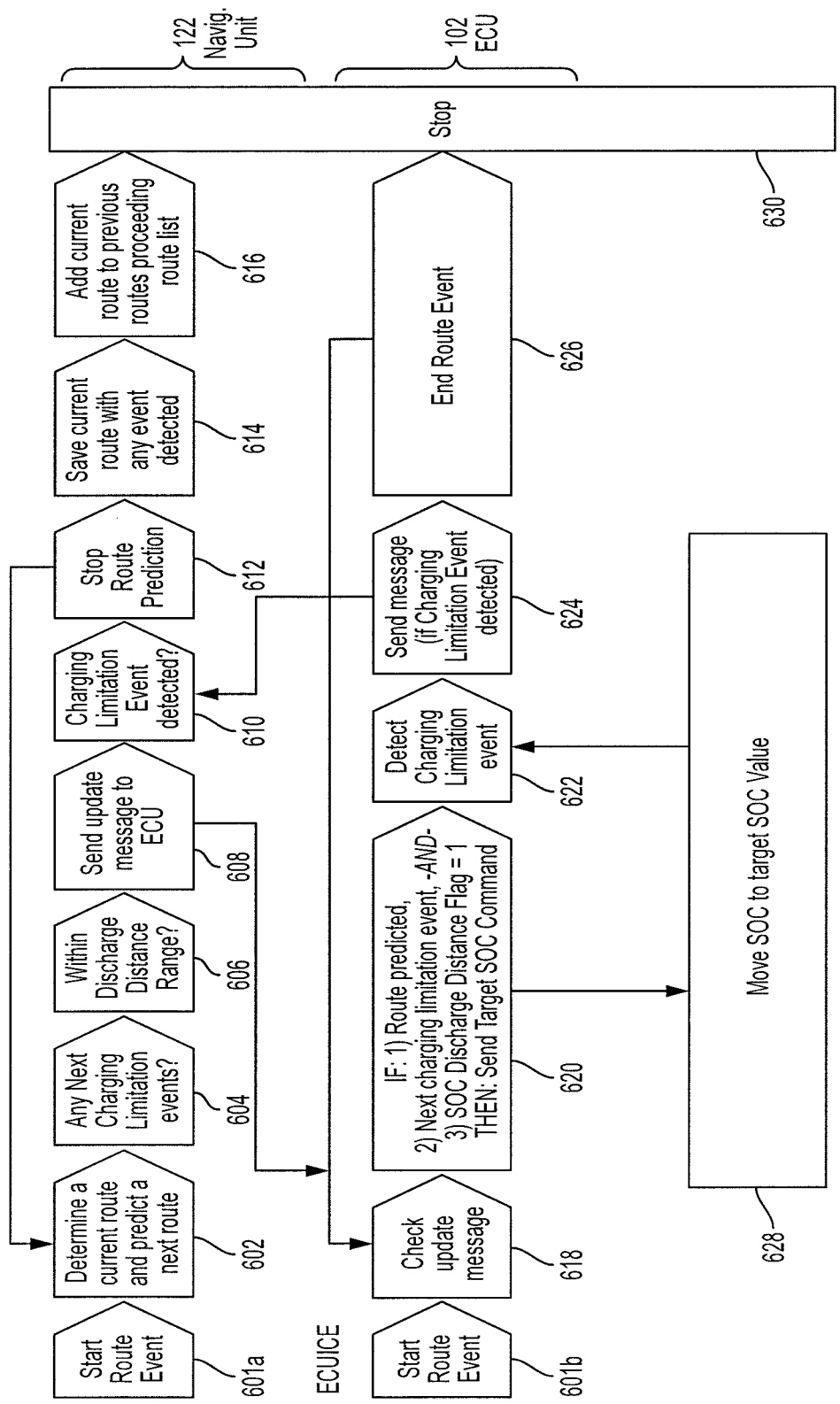
FIG. 6 illustrates a flowchart diagram of interactions between an electronic control unit and a navigation unit in order to manage vehicle operations based on a route prediction algorithm, according to an aspect of the present invention.

FIG. 6 illustrates a process flow diagram of interaction between the ECU 102 and the navigation unit 122, in order to manage vehicle operations based on a route prediction algorithm. The start route event 601*a*/601*b* indicates the beginning of the route. This event may be triggered by the ignition being set to an on state, or other factors as set forth above with respect to FIG. 2. Referring to block 602, the processor of the navigation unit 122 determines a current route and predicts a next route. Referring to step 604, the processor of the navigation unit 122 determines whether there is a next charging limitation event associated with the next route similarly to the process described above with respect to step 216.

Referring to step 606, the processor of the navigation unit 122 determines whether the vehicle is within the discharge distance (similarly to the process described above with respect to step 220 of FIG. 2). Referring to step 608, the navigation unit 122 sends an update message to the ECU 102 indicating the charging limitation event flag and the SOC discharge distance flag.

The ECU 102 checks update messages received from the navigation unit 122 periodically or alternatively, when triggered by the navigation unit 122 (block 618). As shown in block 620, if (1) a route is predicted, (2) there is a next charging limitation event for the next route, and (3) the vehicle is travelling within the discharge distance, then a target SOC value is set. Referring to block 628, the ECU 102 controls discharging of the battery 118 to reach the target SOC value at the end of the current route similarly to step 222 of FIG. 2.

Referring to block 622, the process determines whether there is a charging limitation event attributable to a full/high SOC (and not battery overheating) on the current route or route that was completed. Accordingly, if the charging limitation event is detected, a message is sent to the navigation unit 122 as shown in block 624. The navigation unit 122 receives the message indicating whether a charging limitation event is detected (block 610).

Route predication is stopped (block 612), and the current route and associated charging limitation events are stored in the memory (block 614). The tables (e.g., Tables 1-4) are populated to reflect that the current route is driven after the previously driven routes (block 616). The end route event 626 may be indicated by an ignition being set to an off state or other factors detected by the ECU 102.

As set forth above, the systems and methods of the invention provide an effective solution for managing vehicle operations based on route prediction in order to enhance overall energy efficiency and reduce fuel consumption.

Steps of flowchart diagrams of FIGS. 2, 4A, 5 and 6 are shown as examples or embodiments of the method/system according to the present invention. It can be appreciated that the steps of FIGS. 2, 4A, 5 and 6 may be performed in a different order without limiting the scope of the invention. Furthermore, one or more intermediary steps can be performed in addition to the shown steps, according to the disclosed invention.

While only certain embodiments of the invention have been described in detail, a person skilled in the art would appreciate that certain changes and modifications may be made in the embodiments without departing from the spirit and scope of the invention. A person skilled in the art would appreciate the invention may be practiced other than as specifically described with respect to the foregoing embodiments of the method/system.

What is claimed is:

1. A hybrid vehicle, comprising:
   wheels;
   an engine for providing a first amount of power for at least one of a movement of the wheels or an operation of the hybrid vehicle; a battery having a state of charge and storing electrical energy;
   a motor configured to utilize the electrical energy from the battery and for providing a second amount of power for at least one of the movement of the wheels or the operation of the hybrid vehicle;
   a memory for storing route data, a charging limitation event that indicates when the state of charge of the battery is greater than or equal to a maximum threshold value where the battery is unable to accept an additional charge for capture, and a duration and a distance where the state of charge is at or above the maximum threshold value and the additional charge is available; and
   an electronic control unit coupled to at least the engine, the motor, and the memory, the electronic control unit configured to:
   predict that the hybrid vehicle will travel on a second route after travelling on a first route based on the route data,
   predict that the state of charge of the battery will be greater than or equal to the maximum threshold value during the second route based on the charging limitation event,
   determine a target value for the state of charge of the battery for the first route that is less than the maximum threshold value based on the stored duration and the stored distance where the state of charge was at or above the maximum threshold value and the additional charge was available, and
   discharge the electrical energy stored in the battery during at least a portion of the first route to decrease the state of charge of the battery to the target value or less by powering the movement of the wheels using the motor to allow the battery to capture the additional charge when the hybrid vehicle travels the second route.

2. The hybrid vehicle of claim 1, wherein the second route was previously travelled after the first route was travelled, and the second route is driven after a time period during which the hybrid vehicle is in an off state.

3. The hybrid vehicle of claim 1, wherein the route data includes location data corresponding to at least a start location of the first route, an end location of the first route, a start location of the second route, and an end location of the second route, and
   wherein the electronic control unit is configured to predict that the hybrid vehicle will travel on the second route after travelling on the first route based on the location data.

4. The hybrid vehicle of claim 1, wherein the electronic control unit is configured to discharge the electrical energy when the electronic control unit determines that the hybrid vehicle is travelling on the first route and is within a discharge distance before a start location of the second route to allow the battery to reach the target value before the hybrid vehicle reaches the start location of the second route.

5. The hybrid vehicle of claim 4, wherein the electronic control unit is configured to determine the discharge distance based on at least one of:
   a distance between the start location of the second route and a location at which the state of charge of the battery is greater than or equal to the maximum threshold value,
   a time period between a start time of the second route and a time at which the state of charge of the battery is greater than or equal to the maximum threshold value,
   a time period or distance during which the state of charge of the battery is greater than or equal to the maximum threshold value, or
   a time period or distance during which the hybrid vehicle travels on a substantially flat or uphill surface before reaching the location at which the state of charge of the battery is greater than or equal to the maximum threshold value.

6. The hybrid vehicle of claim 1, wherein the electronic control unit is configured to predict that the hybrid vehicle will travel on the second route after travelling on the first route further based on a number of times the hybrid vehicle has travelled on the second route after the first route as compared with a number of times the hybrid vehicle has travelled on another route after the first route.

7. The hybrid vehicle of claim 1, wherein the electronic control unit is further configured to:
determine that the hybrid vehicle is traveling on the first route,
determine that the state of charge of the battery is greater than or equal to the maximum threshold value, and
store the charging limitation event corresponding to the first route in the memory, and
wherein the electronic control unit is configured to discharge the electrical energy stored in the battery further based on the charging limitation event.

8. The hybrid vehicle of claim 7, further comprising a regenerative braking unit configured to store the electrical energy in the battery when the hybrid vehicle decelerates in response to braking,
wherein the charging limitation event occurs when the battery is unable to store the electrical energy generated by the regenerative braking unit and the state of charge of the battery is greater than or equal to the maximum threshold value.

9. The hybrid vehicle of claim 7, further comprising a sensor configured to detect a battery temperature,
wherein the electronic control unit is configured to store the charging limitation event in the memory when the electronic control unit determines that inability of the battery to store the electrical energy is due to the state of charge of the battery being greater than or equal to the maximum threshold value and not due to overheating of the battery based on the state of charge of the battery and the battery temperature.

10. The hybrid vehicle of claim 7, wherein the electronic control unit is configured to discharge the electrical energy stored in the battery to prevent the charging limitation event when the battery is greater than or equal to the maximum threshold value within a threshold distance from a start location of the second route.

11. The hybrid vehicle of claim 1, wherein each of the first route and the second route begins when the hybrid vehicle is started and set to an on state and ends when the hybrid vehicle is shut off and set to an off state, and
wherein each of the first route and the second route include a plurality of route segments, the plurality of route segments determined based on at least turning of a steering wheel of the hybrid vehicle.

12. A system for optimizing energy efficiency of a hybrid vehicle, the system comprising:
an engine for providing a first amount of power for at least one of a movement of the hybrid vehicle or an operation of a device of the hybrid vehicle;
a battery having a state of charge and storing electrical energy;
a motor configured to utilize the electrical energy from the battery and for providing a second amount of power for the at least one of the movement of the hybrid vehicle or the operation of the device of the hybrid vehicle;
a memory for storing route data, a charging limitation event that indicates when the state of charge of the battery is greater than or equal to a maximum threshold value where the battery is unable to accept an additional charge for capture, and a duration and a distance where the state of charge is at or above the maximum threshold value and the additional charge is available; and
a navigation unit having a processor communicatively coupled to the memory and configured to:
predict that the hybrid vehicle will travel on a second route after travelling on a first route based on the route data, and
predict that the state of charge of the battery will be greater than or equal to a maximum threshold value during the second route based on the charging limitation event; and
an electronic control unit communicatively coupled to the navigation unit and configured to:
determine a target value for the state of charge of the battery for the first route that is less than the maximum threshold value based on the stored duration and the stored distance where the state of charge was at or above the maximum threshold value and the additional charge was available, and
discharge the electrical energy stored in the battery during at least a portion of the first route to decrease the state of charge of the battery to the target value or less by powering the movement of the hybrid vehicle using the motor.

13. The system of claim 12, wherein the electronic control unit is configured to discharge the electrical energy stored in the battery when the processor of the navigation unit predicts that the state of charge of the battery is greater than or equal to the maximum threshold value during the second route, and that the hybrid vehicle is travelling on the first route within a distance of a start location of the second route.

14. The system of claim 12, wherein the electronic control unit is configured to discharge the electrical energy when the hybrid vehicle is travelling on the first route and is within a discharge distance before a start location of the second route to allow the battery to reach the target value before the hybrid vehicle reaches the start location of the second route.

15. The system of claim 12, wherein the route data includes location data corresponding to at least a start location of the first route, an end location of the first route, a start location of the second route, and an end location of the second route, and the processor of the navigation unit is configured to predict that the hybrid vehicle will travel on the second route after travelling on the first route based on the location data.

16. A method of enhancing energy efficiency of a hybrid vehicle having wheels, an engine, a battery with a state of charge, a motor, a memory, and at least one processor, the method comprising:
storing, in the memory, first location data and first time data for a first route;
storing, in the memory, second location data and second time data for a second route;
storing, in the memory, a link or relationship between the first route and the second route;
determining, using the at least one processor, a battery charging limitation event on the second route, the battery charging limitation event indicating that the state of charge of the battery is greater than or equal to a maximum threshold value that indicates when the battery is unable to accept additional charge;
storing, in the memory, the battery charging limitation event;

storing, in the memory, a duration and a distance where the state of charge is at or above the maximum threshold value and the additional charge is available;

predicting that the hybrid vehicle will travel on the second route after traveling on the first route, based on the link or relationship between the first route and the second route;

predicting that the battery charging limitation event will occur during the second route;

determining a target value for the state of charge of the battery for the first route that is less than the maximum threshold value based on the battery charging limitation event and the stored duration and the stored distance where the state of charge is at or above the maximum threshold value and the additional charge is available during the second route; and discharging the electrical energy stored in the battery during at least a portion of the first route based on the target value for the state of charge to increase an amount of the electrical energy stored in the battery that is consumed.

17. The hybrid vehicle of claim 16, further comprising:
determining that the hybrid vehicle is traveling on the first route and is within a discharge distance before arriving at a start location of the second route, wherein discharging the electrical energy stored in the battery during at least a portion of the first route is performed when the second route is predicted to be travelled after the first route and the hybrid vehicle is travelling on the first route and within the discharge distance before arriving at the start location of the second route.

18. The hybrid vehicle of claim 16, wherein the link or relationship between the first route and the second route is based on a number of times the hybrid vehicle has travelled on the second route after the first route as compared with a number of times the hybrid vehicle has travelled on another route after the first route.

19. The hybrid vehicle of claim 16, further comprising detecting, using a sensor, a temperature of the battery, wherein storing, in the memory, the battery charging limitation event is based on the temperature of the battery and the state of charge of the battery.

* * * * *